US011056931B2

(12) United States Patent
Park et al.

(10) Patent No.: US 11,056,931 B2
(45) Date of Patent: Jul. 6, 2021

(54) WIRELESS POWER TRANSFER METHOD AND DEVICE THEREFOR

(71) Applicant: LG INNOTEK CO., LTD., Seoul (KR)

(72) Inventors: Jay Park, Seoul (KR); Jong Heon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/644,380

(22) PCT Filed: Aug. 21, 2018

(86) PCT No.: PCT/KR2018/009606
§ 371 (c)(1),
(2) Date: Mar. 4, 2020

(87) PCT Pub. No.: WO2019/045350
PCT Pub. Date: Mar. 7, 2019

(65) Prior Publication Data

US 2020/0204009 A1 Jun. 25, 2020

(30) Foreign Application Priority Data

Sep. 4, 2017 (KR) ........................ 10-2017-0112735

(51) Int. Cl.
*H02J 50/80* (2016.01)
*H02J 50/60* (2016.01)
(Continued)

(52) U.S. Cl.
CPC ................ *H02J 50/80* (2016.02); *H02J 7/02* (2013.01); *H02J 50/12* (2016.02); *H02J 50/60* (2016.02); *H02J 50/402* (2020.01)

(58) Field of Classification Search
CPC .. H02J 50/80; H02J 50/12; H02J 50/60; H02J 7/02; H02J 50/402; H02J 50/20; H02J 5/005; H02J 7/025
(Continued)

(56) References Cited

U.S. PATENT DOCUMENTS

2014/0015335 A1 1/2014 Lee et al.
2014/0225628 A1 8/2014 Yoon et al.
(Continued)

FOREIGN PATENT DOCUMENTS

KR 10-2012-0077448 7/2012
KR 10-2013-0045883 5/2013
(Continued)

OTHER PUBLICATIONS

International Search Report (with English Translation) and Written Opinion dated Jan. 30, 2019 issued in Application No. PCT/KR2018/009606.

*Primary Examiner* — Metasebia T Retebo
(74) *Attorney, Agent, or Firm* — KED & Associates LLP

(57) ABSTRACT

The present invention relates to wireless power transmission technology, and more particularly, to a wireless power transfer method and a device therefor. The wireless power transfer method may include operating with a first driving voltage, determining whether a ping phase is entered, determining whether the wireless power transmitter is in a first state when the ping phase is entered; and operating with a second driving voltage when the first state is determined.

19 Claims, 8 Drawing Sheets

S203
210
S201
Ping phase
220
S202
S204
Selection phase
Identification and configuration phase
230
S205
S205
S208
Power transfer phase
240
S207

(51) Int. Cl.

| | |
|---|---|
| ***H02J 50/12*** | (2016.01) |
| ***H02J 7/02*** | (2016.01) |
| *H02J 50/40* | (2016.01) |

(58) Field of Classification Search
USPC .......................................................... 307/104
See application file for complete search history.

(56) References Cited

U.S. PATENT DOCUMENTS

| | | | | |
|---|---|---|---|---|
| 2014/0266036 | A1* | 9/2014 | Jung ....................... | H02J 50/12 320/108 |
| 2015/0123602 | A1 | 5/2015 | Patino et al. | |
| 2016/0123602 | A1 | 5/2016 | Cabrelle et al. | |
| 2017/0331334 | A1 | 11/2017 | Park | |
| 2017/0366048 | A1 | 12/2017 | Watanabe et al. | |

FOREIGN PATENT DOCUMENTS

| | | |
|---|---|---|
| KR | 10-2014-0008975 | 1/2014 |
| KR | 10-2014-0102553 | 8/2014 |
| KR | 10-2014-0113147 | 9/2014 |
| KR | 10-2016-0061121 | 5/2016 |
| KR | 10-2017-0016171 | 2/2017 |
| WO | WO 2016/140004 | 9/2016 |

* cited by examiner

WIRELESS POWER TRANSFER METHOD AND DEVICE THEREFOR

CROSS-REFERENCE TO RELATED PATENT APPLICATIONS

This application is a U.S. National Stage Application under 35 U.S.C. § 371 of PCT Application No. PCT/KR2018/009606, filed Aug. 21, 2018, which claims priority to Korean Patent Application No. 10-2017-0112735, filed Sep. 4, 2017, whose entire disclosures are hereby incorporated by reference.

TECHNICAL FIELD

The present invention relates to wireless power transfer technology, and more particularly, to a wireless power transfer method and a device therefor.

BACKGROUND ART

Portable terminals such as mobile phones and laptop computers include a battery that stores power and circuits for charging and discharging the battery. In order for the battery of the terminal to be charged, power is to be supplied from an external charger.

In general, as an example of an electrical connection method between a charging device and for charging a battery with power and the battery, there is a terminal supply method of supplying electric energy to the battery through a terminal of the battery by receiving commercial power and converting the commercial power into a voltage and a current corresponding to the battery. This terminal supply method is accompanied by the use of a physical cable or wire. Therefore, many cables occupy considerable working space, are difficult to organize, and are not good in appearance when a lot of devices employing the terminal supply method are used. In addition, the terminal supply method may cause problems such as instantaneous discharge phenomenon due to different potential difference between terminals, burnout and fire caused by foreign substances, natural discharge, or deterioration of battery life and performance.

Recently, in order to solve such a problem, a charging system (hereinafter referred to as a "wireless charging system") and a control method using a method of transmitting power wirelessly have been proposed. In addition, since the wireless charging system was not pre-installed in some portable terminals in the past and the consumer had to separately purchase a wireless charging receiver accessory, the demand for the wireless charging system was low, but the number of wireless charging users is expected to increase rapidly and terminals are expected to be equipped with wireless charging function by terminal manufacturers in the future.

In general, the wireless charging system includes a wireless power transmitter for supplying electrical energy through a wireless power transfer method and a wireless power receiver for charging the battery by receiving the electrical energy supplied from the wireless power transmitter.

The wireless charging system may transmit power according to at least one wireless power transfer method (e.g., electromagnetic induction method, electromagnetic resonance method, RF wireless power transfer method, or the like).

For example, the wireless power transfer method may use various wireless power transfer standards based on the electromagnetic induction method of performing charging using an electromagnetic induction principle in which a magnetic field is generated by a power transmitter coil and electricity is induced in a receiver coil due to the influence of the magnetic field. Here, electromagnetic induction-based wireless power transfer standards may include an electromagnetic induction-based wireless charging technology defined by the Wireless Power Consortium (WPC) and Air Fuel Alliance (formerly Power Matters Alliance (PMA)).

As another example, the wireless power transfer method may use the electromagnetic resonance method of transmitting power to a wireless power receiver located in close proximity by tuning a magnetic field generated by a transmission coil of a wireless power transmitter to a specific resonance frequency. Here, the electromagnetic resonance method may include a wireless charging technology of the resonance method defined in the Air Fuel Alliance (formerly, Alliance for Wireless Power (A4WP)) standard organization which is a wireless charging technology standard organization.

As another example, the wireless power transfer method may use the RF wireless power transfer method of transmitting power to a wireless power receiver located at a far distance by allowing energy of low power to be carried by an RF signal.

On the other hand, when a foreign substance exists in a wireless charging region, the electromagnetic field is absorbed by the foreign substance and heating phenomenon occurs. In addition, when the foreign substance includes an electronic device or the like, noise may be caused when the electromagnetic field is absorbed. In general, the noise of about 40 dB is enough to make people feel uncomfortable to sleep, and the noise occurring when the electromagnetic field is absorbed is about 35 dB to 40 dB, which may cause inconvenience to a person. In addition, when the wireless power transmitter generates a detection signal to detect a wireless power receiver, a current flowing through coils increases to generate heat and consume unnecessary power. In addition, there is a problem that the electromagnetic field generated by the wireless power transmitter interferes with an FM radio frequency.

The present disclosure has been devised to solve the above problems of the prior art, and an object of the present disclosure is to provide a wireless power transfer method and a device therefor.

Furthermore, another object of the present disclosure is to provide a wireless power transfer method and a device therefor capable of removing noise caused by a foreign substance.

Furthermore, another object of the present disclosure is to provide a wireless power transfer method and a device therefor capable of eliminating heating phenomenon by a foreign sub stance.

Furthermore, another object of the present invention is to provide a wireless power transfer method and a device therefor capable of reducing standby power according to whether a foreign substance is detected.

Furthermore, another object of the present disclosure is to provide a wireless power transfer method and a device therefor capable of removing interference with an FM radio frequency according to whether a foreign substance is detected.

Furthermore, another object of the present disclosure to provide a wireless power transfer method and a device therefor capable of removing heating phenomenon of a wireless power transmitter according to whether a foreign substance is detected.

Furthermore, another object of the present disclosure is to provide a wireless power transfer method and a device therefor capable of adaptively controlling a driving voltage according to whether a foreign substance is detected.

Furthermore, another object of the present disclosure is to provide a wireless power transfer method and a device therefor capable of adaptively controlling transmission of a ping signal according to whether a foreign substance is detected.

The technical problems to be solved by the present disclosure are not limited to the aforementioned problems, and any other technical problems not mentioned herein will be clearly understood from the following description by those skilled in the art to which the present invention pertains.

In order to solve the above technical problem, a wireless power transfer method according to an embodiment may include operating with a first driving voltage, determining whether a ping phase is entered, determining whether the wireless power transmitter is in a first state when the ping phase is entered, and operating with a second driving voltage when the first state is determined.

In addition, the determining of whether the wireless power transmitter is in the first state may include transmitting a first detection signal to the wireless power receiver, measuring an internal current of the wireless power receiver, determining whether the measured internal current is greater than or equal to a first reference current, and determining the first state when the measured internal current is greater than or equal to a first reference current.

In addition, in the wireless power transfer method according to an embodiment, the determining of whether the wireless power transmitter is in the first state may further determining whether the first state is maintained for a first reference time.

In addition, in the wireless power transfer method according to an embodiment, the determining of whether the wireless power transmitter is in the first state may further include determining whether a response signal to the first detection signal is received from the wireless power receiver.

In addition, the wireless power transfer method according to an embodiment may further include transmitting a second detection signal to the wireless power receiver when operating with the second driving voltage, measuring an internal current of the wireless power transmitter after transmission of the second detection signal, determining whether the measured internal current is less than a second reference current after transmission of the second detection signal, determining the second state when the measured internal current is less than a second reference current after transmission of the second detection signal, determining whether the second state is maintained for a second reference time, and operating with the first driving voltage when the second state is maintained for the second reference time.

In addition, in the wireless power transfer method according to an embodiment, the first reference current may be larger than the second reference current.

In addition, in the wireless power transfer method according to an embodiment, the first reference time may be longer than the second reference time.

In addition, in the wireless power transfer method according to an embodiment, the first driving voltage may be larger than the second driving voltage.

In addition, in the wireless power transfer method according to an embodiment, the first state may be a state in which a foreign substance exists in a charging region of the wireless power transmitter, and the second state may be a state in which a foreign substance is removed in the charging region of the wireless power transmitter.

In addition, in the wireless power transfer method according to an embodiment, the third state may be a state in which the wireless power receiver exists in a charging region of the wireless power transmitter, and the first reference current may be a maximum internal current value when the wireless power transmitter operates with the first driving voltage.

In addition, in the wireless power transfer method according to an embodiment, the determining of whether the wireless power transmitter is in the first state further may include initializing a first detection signal counter; transmitting a first detection signal to the wireless power receiver, determining whether a response signal to the first detection signal is received from the wireless power receiver, increasing the first detection signal counter by one and determining whether the first detection signal counter exceeds a predetermined threshold when the response signal is not received, and determining the first state when the first detection signal counter exceeds the predetermined threshold.

In addition, in the wireless power transfer method according to an embodiment, the operating with the second driving voltage in the first state may include initializing the first detection signal counter.

In addition, the wireless power transfer method according to an embodiment may further include transmitting a second detection signal to the wireless power receiver when operating with the second driving voltage, and determining whether a response signal to the second detection signal is received from the wireless power receiver.

In addition, the wireless power transfer method according to an embodiment may further include operating in a sleep mode during a sleep period when a response signal to the second detection signal is not received.

In addition, the wireless power transfer method according to an embodiment may further include transmitting the second detection signal to the wireless power receiver when the sleep period has elapsed.

In addition, in the wireless power transfer method according to an embodiment, the first driving voltage may be larger than the second driving voltage.

A wireless power transmitter for wirelessly transmitting power to a warless power receiver according to an embodiment may include a power converter configured to provide a first driving voltage, a power transmitting unit configured to transmit a first detection signal based on the first driving voltage, and a controller configured to perform control such that the power converter provides a second driving voltage in a first state.

In addition, the wireless power transmitter according to an embodiment may further include a current sensor configured to measure an internal current of the wireless power transmitter, and the controller may determine the first state when the measured internal current is greater than or equal to a first reference current and perform control such that the power transmitting unit transmits a second detection signal based on the second detection voltage.

In addition, in the wireless power transmitter according to an embodiment, the controller may initialize a first detection signal counter when a ping phase is entered, increase the first detection signal counter by one when a response signal to the first detection signal is not received, and determining the first state when the first detection signal counter exceeds a predetermined threshold.

In addition, in the wireless power transmitter according to an embodiment, the controller may perform control such that the power transmitting unit transmits a second detection signal based on the second driving voltage when the first state is determined.

The effects of the wireless power transfer method and the device therefor according to the present disclosure are given as follows.

The present disclosure may provide a wireless power transfer method and a device therefor.

Further, the present disclosure may provide a wireless power transfer method and a device therefor capable of removing noise caused by a foreign substance.

Further, present disclosure may provide a wireless power transfer method and a device therefor capable of removing heating phenomenon due to a foreign substance.

Further, the present disclosure may provide a wireless power transfer method and a device therefor capable of reducing standby power according to whether a foreign substance is detected.

Further, the present disclosure may provide a wireless power transfer method and a device therefor capable of removing interference with an FM radio frequency according to whether a foreign substance is detected.

Further, the present disclosure may provide a wireless power transfer method and a device therefor capable of removing the heating phenomenon of the wireless power transmitter according to whether a foreign substance is detected.

Further, the present disclosure may provide a wireless power transfer method and a device therefor capable of adaptively controlling a driving voltage according to whether a foreign substance is detected.

Further, the present disclosure may provide a wireless power transfer method and a device therefor capable of adaptively controlling transmission of a ping signal according to whether a foreign substance is detected.

The technical problems to be solved by the present disclosure are not limited to the aforementioned problems, and any other technical problems not mentioned herein will be clearly understood from the following description by those skilled in the art to which the present invention pertains.

DESCRIPTION OF DRAWINGS

The accompanying drawings are provided to facilitate understanding of the present disclosure, and provide embodiments of the present disclosure together with a detailed description. However, the technical features of the present disclosure are not limited to the specific drawings, and the features disclosed in the drawings may be combined with each other to constitute a new embodiment.

MODE FOR INVENTION

Figure 1:
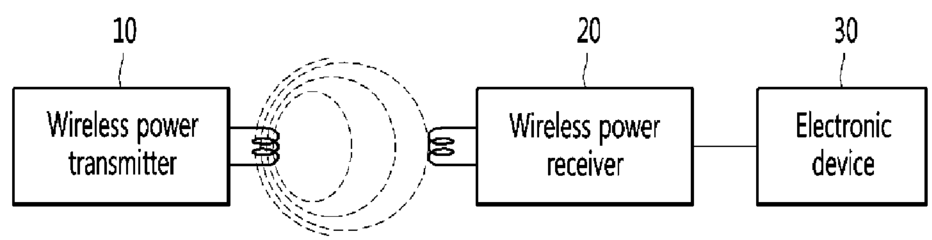
FIG. 1 is a block diagram illustrating a wireless charging system according to an embodiment.

Hereinafter, embodiments of the present disclosure will be described in detail with reference to the accompanying drawings. However, it should be understood that the technical scope of the present disclosure is not limited to some embodiments described, but may be implemented in various forms, and one or more of the components may be selectively selected, combined or substituted within the technical scope of the present disclosure. Unless defined otherwise, all the terms (including technical and scientific terms) used herein have the same meaning as commonly understood by one of ordinary skill in the art to which the present invention belongs. It will be further understood that the terms, such as those defined in commonly used dictionaries, should be interpreted as having meanings that are consistent with their meanings in the context of the relevant art. The terminology used in embodiments of the present disclosure is for the purpose of describing particular embodiments only and is not intended to be limiting of the inventive concept. In this specification, the singular may also include the plural unless the context clearly indicates otherwise, and "at least one (or more than one) of A, B and C" used herein may include one or more of all possible combinations of A, B, and C. In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. It should be noted that when it is described in the specification that one component is "connected," "coupled" or "joined" to another component, the former may be directly "connected," "coupled," and "joined" to the latter or "connected", "coupled", and "joined" to the latter via another component. In addition, it will be understood that, when each component is referred to as being formed or disposed "on (above)" or "under (below)" the other component, it can be directly "on" or "under" the other component or be indirectly formed with one or more intervening components therebetween. In addition, it will also be understood that, when each component is referred to as being formed or disposed "on (above)" or "under (below)" the other component, it may mean an upward direction and a downward direction of the component.

In the description of embodiments, a device for transmitting wireless power in a wireless charging system may be used interchangeably with a wireless power transmitter, a wireless power transfer device, a wireless power transfer apparatus, a wireless electric power transmitter, a transmission end, a transmitter, a transmission device, a transmission side, a wireless power transfer device, a wireless power charging device, or the like for convenience of description. A device for receiving wireless power from a wireless power transfer device may be used interchangeably with a wireless electric power reception apparatus, a wireless electric power receiver, a wireless power reception device, a wireless power receiver, a reception terminal, a reception side, a reception device, a receiver, or the like for convenience of description.

The wireless charging device according to embodiment may be configured in the form of a pad, a cradle, an access point (AP), a small base station, a stand, a ceiling embedded structure or a wall-mounted structure, and a single transmitter may transmit power to a plurality of wireless power reception devices.

For example, the wireless power transmitter may not only be used on a desk or a table, but also may be developed and applied to an automobile to be used in a vehicle. The wireless power transmitter installed in a vehicle may be provided in the form of a cradle that can be fixed and mounted simply and stably.

A terminal according to embodiments be used in small electronic devices such as a mobile phone, a smart phone, a laptop computer, a digital broadcasting terminal, a Personal Digital Assistants (PDA), a Portable Multimedia Player (PMP), a navigation device, an MP3 player, an electric toothbrush, an electronic tag, a lighting device, a remote control, a fishing bobber, or the like, but is not limited thereto. The terminal may be any mobile device (hereinafter, referred to as a "device") as long as it can be charged by a battery equipped with a wireless power receiver according to an embodiment and may be used with "terminal" or "device" interchangeably. The wireless power receiver according to another embodiment may be mounted in a vehicle, an unmanned aerial vehicle, an air drone, or the like.

The wireless power receiver according to embodiments may be provided with at least one wireless power transfer scheme, and may simultaneously receive wireless power from two or more wireless power transmitters. The wireless power transfer method may include at least one of the electromagnetic induction method, the electromagnetic resonance method, and the RF wireless power transfer method. In particular, wireless power reception means supporting the electromagnetic induction method may include an electromagnetic induction-based wireless charging technology defined in the Wireless Power Consortium (WPC) and Power Matters Alliance (formerly Power Matters Alliance (PMA)) which are the wireless charging technology standard organizations. In addition, wireless power reception means supporting the electromagnetic resonance method may include a wireless charging technology of the resonance method defined in the Air Fuel Alliance (formerly, Alliance for Wireless Power (A4WP)) standard organization which is a wireless charging technology standard organization.

In general, a wireless power transmitter and a wireless power receiver constituting a wireless power system may exchange control signals or information through in-band communication or Bluetooth low energy (BLE) communication. Here, the in-band communication and the BLE communication may be performed by a pulse width modulation scheme, a frequency modulation scheme, a phase modulation scheme, an amplitude modulation scheme, an amplitude and phase modulation scheme, or the like. For example, the wireless power receiver may transmit various control signals and information to the wireless power transmitter by generating a feedback signal by switching ON/OFF of a current induced through a reception coil in a predetermined pattern. The information transmitted by the wireless power receiver may include various state information including received power strength information. In this case, the wireless power transmitter may calculate a charging efficiency or a power transfer efficiency based on the received power strength information.

FIG. 1 is a block diagram illustrating a wireless charging system according to an embodiment.

Referring to FIG. 1, a wireless charging system may roughly include a wireless power transmitter 10 that transmits power wirelessly, a wireless power receiver 20 that receives the transmitted power, and an electronic device 30 that is supplied with the received power.

For example, the wireless power transmitter 10 and the wireless power receiver 20 may perform in-band communication in which information is exchanged using the same frequency band as an operating frequency used for wireless power transfer. In another example, the wireless power transmitter 10 and the wireless power receiver 20 may perform out-of-band communication in which information is exchanged using a separate frequency band different from the operating frequency used for wireless power transfer.

For example, the information exchanged between the wireless power transmitter 10 and the wireless power receiver 20 may include control information as well as status information of each other. Here, the status information and control information exchanged between the wireless power transmitter and the wireless power receiver will be more clear through the description of embodiments to be described later.

The in-band communication and the out-of-band communication may provide bidirectional communication, but are not limited thereto. In another embodiment, the in-band communication and the out-of-band communication may provide one-way communication or half-duplex communication.

For example, the one-way communication may mean that the wireless power receiver 20 transmits information to only the wireless power transmitter 10, but is not limited thereto, and may mean that the wireless power transmitter 10 transmits information to the wireless power receiver 20.

In the half-duplex communication method, bidirectional communication between the wireless power receiver 20 and the wireless power transmitter 10 is possible, but only one device can transmit information at a time The wireless power receiver 20 according to an embodiment may obtain various state information of the electronic device 30. As an example, the state information of the electronic device 30 may include current power usage information, information for identifying a running application, CPU usage information, battery charge status information, battery output voltage/current information, temperature information, and the like, but is not limited thereto, and may be any information as long as the information is obtained from the electronic device 30 and available for wireless power control.

Figure 2:
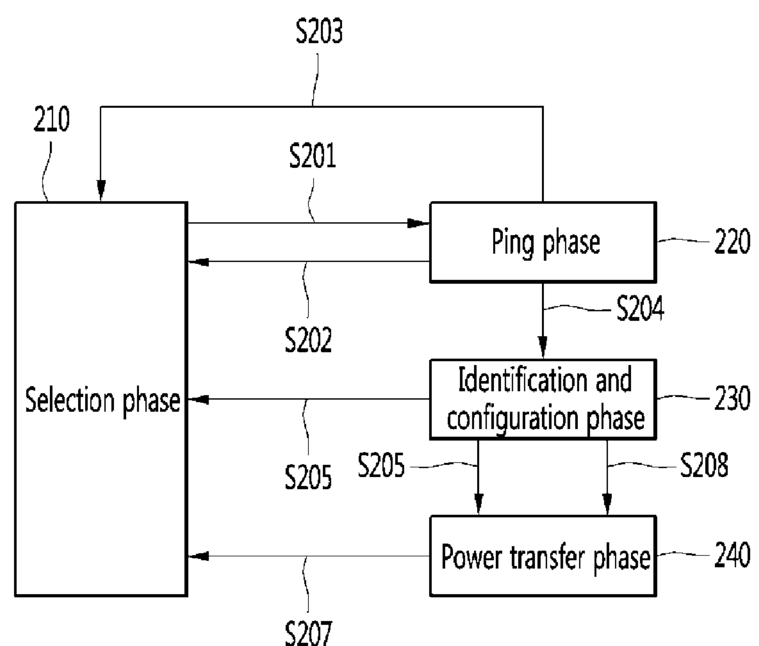
FIG. 2 is a state transition diagram for describing a first wireless power transfer procedure defined in the WPC standard.

FIG. 2 is a state transition diagram for describing a first wireless power transfer procedure defined in the WPC standard.

Referring to FIG. 2, power transfer from a transmitter to a receiver according to the first wireless power transfer procedure of the WPC standard is broadly divided into a selection phase 210, a ping phase 220, and an identification and configuration phase, 230, and a power transfer phase 240.

The selection phase 210 may be a phase in which transition occurs when a specific error or a specific event is detected when power transfer is started or is maintained. Here, the specific error and the specific event will be clarified through the following description. Further, in the selection phase 210, the transmitter may monitor whether an object is present at an interface surface. When the transmitter detects an object being placed on the interface surface, the transmitter may transition to the ping phase 220 (S201). In the selection phase 210, the transmitter may transmit an analog ping signal of a very short pulse and detect whether there is an object in the active area of the interface surface based on a change in current of transmission coils.

When an object is detected in the ping phase 220, the transmitter may activate the receiver and transmit a digital ping for identifying whether the receiver is a receiver that is compliant with the WPC standard. When the transmitter does not receive a response signal (e.g., a signal strength indicator) for the digital ping from the receiver in the ping phase 220, the transmitter may transition back to the selection phase 210 (S202). In addition, when the transmitter receives, from the receiver, a signal indicating completion of power transfer, that is, a charge completion signal, the transmitter may transition to the selection phase 210 (S203).

Once the ping phase 220 is complete, the transmitter may transition to the identification and configuration phase 230 for identifying the receiver and collecting configuration and state information of the receiver (S204).

In the identification and configuration phase 230, the transmitter may transition to the selection phase 210 when an unexpected packet is received, a desired packet is not received for a predefined time (timeout), there is a transmission error in a packet or no power transfer contract is made (S205).

When the identification and configuration of the receiver is completed, the transmitter may transition to the power transfer phase 240 for transmitting wireless power (S206).

In the power transfer phase 240, the transmitter may transition to the selection phase (210) when an unexpected packet is received, an desired packet is not received for a predefined time (timeout), or a violation of a pre-established power transfer contract occurs (power transfer contract violation), and charging is complete (S207).

In addition, in the power transfer phase 240, when it is necessary to reconfigure the power transfer contract according to a change in the state of the transmitter or the like, the transmitter may transition to the identification and configuration phase 230 (S208).

The power transfer contract may be set based on states and characteristic information of the transmitter and the receiver. For example, the transmitter state information may include information on a maximum amount of transmittable power and information on a maximum number of acceptable receivers, and the receiver state information may include information on the required power.

Figure 3:
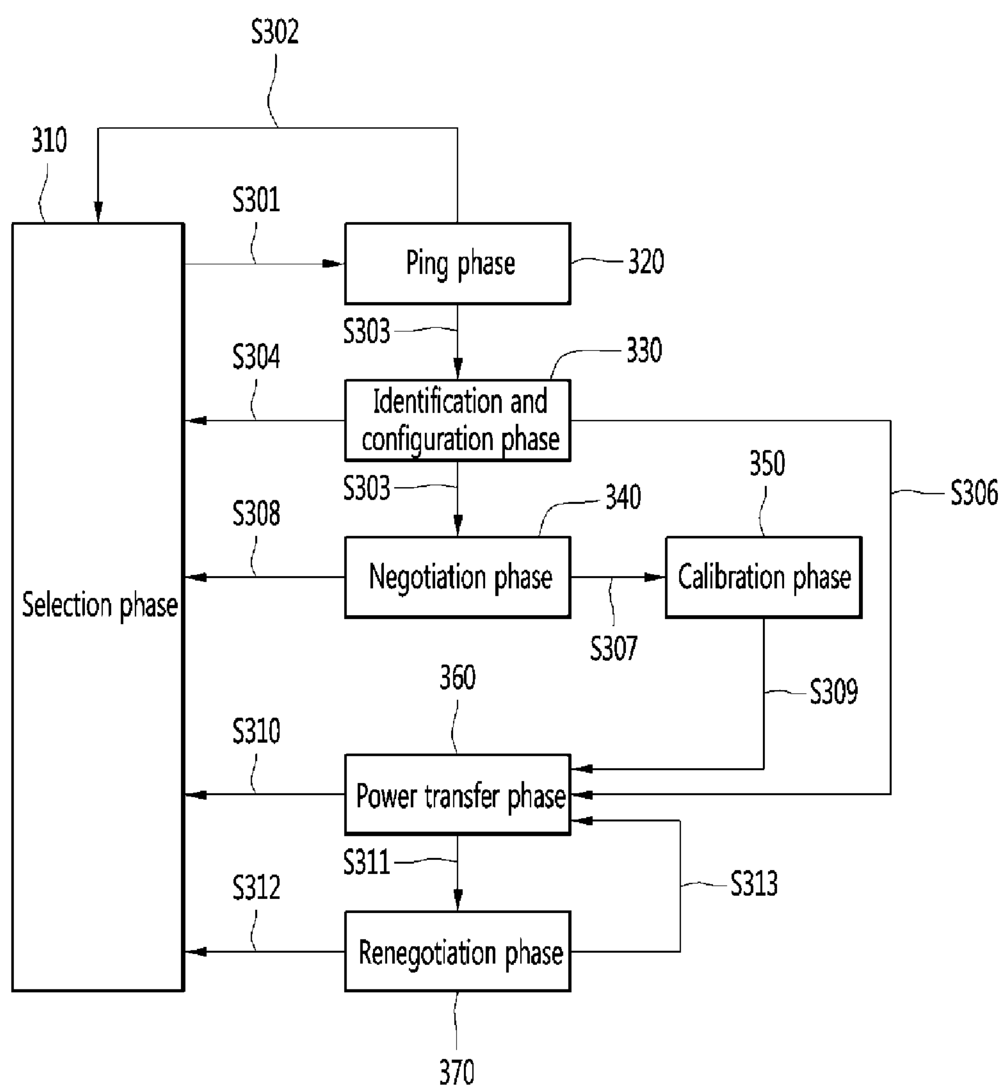
FIG. 3 is a state transition diagram for describing a second wireless power transfer procedure defined in the WPC standard.

FIG. 3 is a state transition diagram for describing a second wireless power transfer procedure defined in the WPC standard.

Referring to FIG. 3, power transfer from a transmitter to a receiver according to the second wireless power transfer procedure of the WPC standard is broadly divided into a selection phase 310, a ping phase 320, and an identification and configuration phase 330, a negotiation phase 340, a calibration phase 350, a power transfer phase 360, and a renegotiation phase 370.

The selection phase 210 may be a phase (for example, including the reference numerals S302, S304, S308, S310, and S312) in which transition occurs when a specific error or a specific event is detected when power transfer is started or is maintained. Here, the specific error and the specific event will be clarified through the following description. Further, in the selection phase 310, the transmitter may monitor whether an object is present at an interface surface. When the transmitter detects an object being placed on the interface surface, the transmitter may transition to the ping phase 320. In the selection phase 210, the transmitter may transmit an analog ping signal of a very short pulse and detect whether there is an object in the active area of the interface surface based on a change in current of transmission coils or primary coils.

When an object is detected in the selection phase 310, the wireless power transmitter may measure a quality factor of a wireless power resonant circuit, for example, a transmission coil and/or a resonant capacitor for wireless power transfer.

The wireless power transmitter may measure an inductance of a wireless power resonant circuit (e.g., a power transmission coil and/or a resonant capacitor).

The quality factor and/or inductance may be used to determine whether a foreign substance exists in the negotiation phase 340 in the future.

When an object is detected in the ping phase 320, the transmitter may wake up a receiver and transmit a digital ping for identifying whether the detected object is a wireless power receiver (S301). When the transmitter does not receive a response signal (e.g., a signal strength packet) to the digital ping from the receiver in ping phase 320, the transmitter may transition back to the selection phase 310. In addition, when the transmitter receives a signal indicating that the power transfer is completed, that is, a charging completion packet in the ping phase 320, the transmitter may transition to the selection phase 310 (S302).

When the ping phase 320 is completed, the transmitter may transition to the identification and configuration phase 330 for identifying the receiver and collecting configuration and state information of the receiver (S303).

When an unexpected packet is received, a desired packet has not been received for a predefined time (time out), a packet transmission error occurs, or a power transfer contract is not set (no power transfer contract) in the identification and configuration phase 330, the transmitter may transition to the selection phase 310 (S304).

The transmitter may determine whether it is required to enter the negotiation phase 340 based on a value of a negotiation field of a configuration packet received in the identification and configuration phase 330.

When negotiation is necessary as a result of the determination, the transmitter may enter a negotiation phase 340 (S305). In the negotiation phase 340, the transmitter may perform a predetermined FOD (foreign object detection) procedure.

On the other hand, when it is determined that negotiation is not necessary, the transmitter may immediately enter the power transfer phase 360 (S306).

In the negotiation phase 340, the transmitter may receive a Foreign Object Detection (FOD) status packet including a reference quality factor value. Alternatively, the FOD status packet including a reference inductance value may be received. Alternatively, a status packet including a reference quality factor value and a reference inductance value may be received. In this case, the transmitter may determine a quality factor threshold for FO detection based on the reference quality factor value. The transmitter may determine an inductance threshold for FO detection based on the reference inductance value.

The transmitter may determine whether the FO exists in a charging region using the determined quality factor threshold for FO detection and the currently measured quality factor value (e.g., may be a quality factor value measured before the ping phase) and control power transfer according to a result of the detection. For example, when the FO is detected, power transfer may be stopped, but the present disclosure is not limited thereto.

The transmitter may determine whether the FO exists in a charging region using the determined inductance threshold for FO detection and the currently measured inductance value (e.g., may be an inductance value measured before the ping phase) and control power transfer according to a result of the detection. For example, when the FO is detected, power transfer may be stopped, but the present disclosure is not limited thereto.

When the FO is detected, the transmitter may return to the selection phase 310 (S308). On the other hand, when the FO is not detected, the transmitter may enter the power transfer phase 360 by passing through the calibration phase 350 (S307 and S309). Specifically, when the FO is not detected, the transmitter may determine a strength of power received by the receiver in the calibration phase 350, and measure power loss at the receiver and the transmitter to determine a strength of power transmitted by the transmitter. That is, the transmitter may predict the power loss based on a difference between transmit power of the transmitter and the receive power of the receiver in the calibration phase 350. According to an embodiment, the transmitter may correct the threshold for FOD detection by reflecting the predicted power loss.

When an unexpected packet is received, a desired packet has not been received for a predefined time (time out), a violation of a preset power transfer contract occurs (power transfer contract violation), or charging is completed in the power transfer phase 360, the transmitter may transition to the selection phase 310 (S310).

In addition, when it is necessary to reconfigure the power transfer contract according to the change in a state of the transmitter or the like in the power transfer phase 360, the transmitter may transition to the renegotiation phase 370 (S311). In this case, when the renegotiation is normally completed, the transmitter may return to the power transfer phase 360 (S313).

The power transfer contract may be set based on states and characteristic information of the transmitter and the receiver. For example, the transmitter state information may include information on a maximum amount of transmittable power and information on a maximum number of acceptable receivers, and the receiver state information may include information on the required power.

When the renegotiation is not normally completed, the transmitter may stop power transfer to a corresponding receiver and transition to the selection phase 310 (S312).

Figure 4:
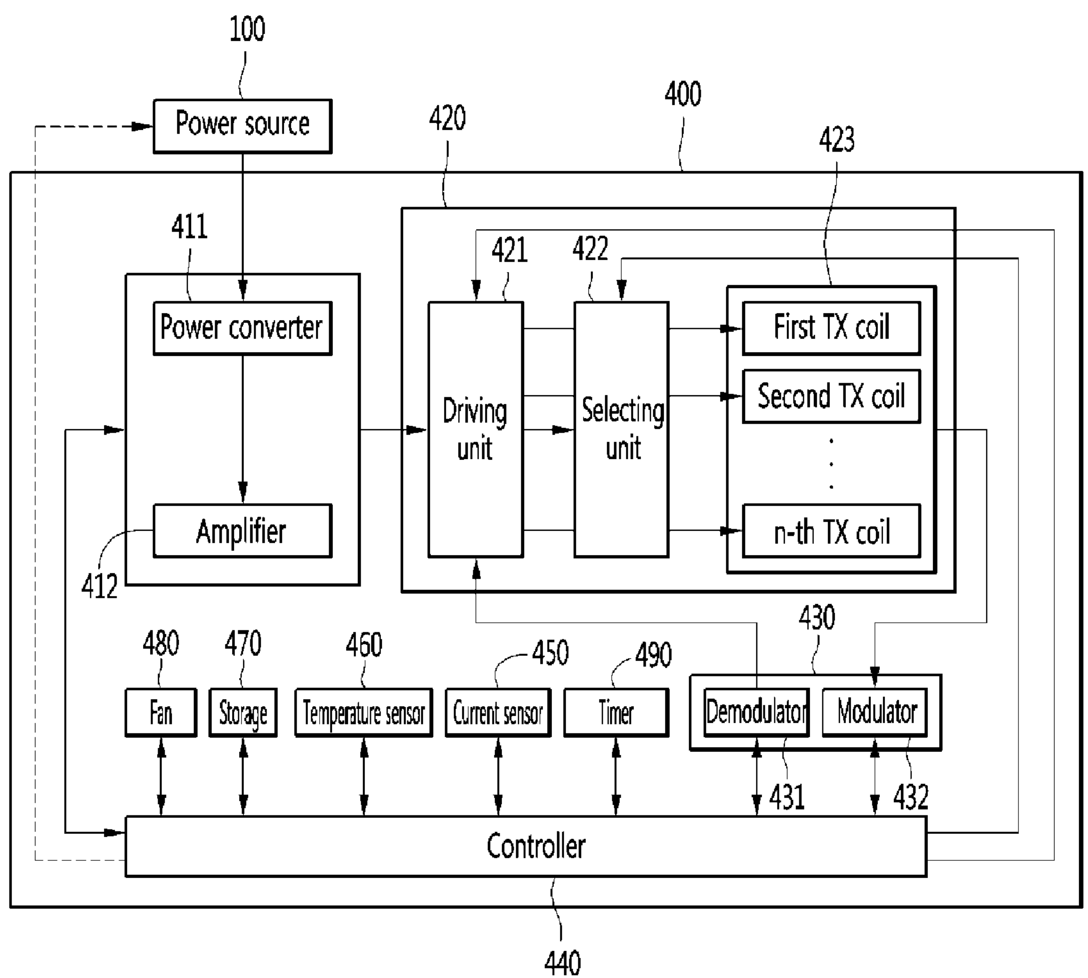
FIG. 4 is a block diagram for describing a structure of a wireless power transmitter according to an embodiment.

FIG. 4 is a block diagram for describing a structure of a wireless power transmitter according to an embodiment.

Referring to FIG. 4, a wireless power transmitter 400 may broadly include a power converter 410, a power transmitting unit 420, a wireless charging communication unit 430, a controller 440, a current sensor 450, a temperature sensor 460, a storage unit 470, a fan 480, and a timer 490. It should be noted that the configuration of the wireless power transmitter 400 is not necessarily an essential configuration and may include more or fewer components.

As shown in FIG. 4, a power source 100 may provide supply power. The power source 100 may correspond to a battery built in the wireless power transmitter 400 or may be an external power source. Embodiments are not limited to the configuration of the power source 100.

When power is supplied from the power source 100, the power converter 410 may perform a function of converting the power into power with a predetermined strength.

To this end, the power converter 410 may include a DC/DC converter 411 and an amplifier 412.

The DC/DC converter 411 may perform a function of converting DC power supplied from the power source 100 into DC power with a specific strength according to a control signal of the controller 440.

The amplifier 412 may adjust the strength of the power resulted from DC/DC conversion according to the control signal of the controller 440. For example, the controller 440 may receive power reception state information or (and) a power control signal of a wireless power receiver through the wireless charging communication unit 430, and dynamically adjust an amplification factor of the amplifier 412 based on the received power reception state information or (and) the power control signal. For example, the power reception state information may include, but is not limited to, strength information of the output voltage of a rectifier, strength information of a current applied to a reception coil or the like. The power control signal may include a signal for requesting an increase in power, a signal for requesting a decrease in power, and the like. As another example, the controller 440 may dynamically adjust the amplification factor of the amplifier 412 according to a state such as the presence or absence of a foreign substance in the charging region. More specifically, when the controller 440 determines that a foreign substance exists in the charging region, the controller 440 may decrease the current flowing through the transmission coil 423 by lowering the amplification factor of the amplifier 412. As still another example, when the controller 440 determines that a foreign substance exists in the charging region, the controller 440 may not provide a voltage or a current to the power transmitting unit 420 by operating in a sleep mode. Accordingly, the wireless power transmitter may eliminate noise by lowering the strength of an electromagnetic field provided to the foreign substance or not providing the electromagnetic field. In addition, the wireless power transmitter may remove heating phenomenon caused by the foreign substance. In addition, the wireless power transmitter may reduce standby power. In addition, the wireless power transmitter may eliminate FM radio frequency interference. In addition, the wireless power transmitter may eliminate the heating phenomenon of the coil. In addition, the wireless power transmitter may control the strength of a driving voltage. In addition, the wireless power transmitter may control the strength of a ping signal. A detailed description thereof will be given with reference to FIGS. 6 to 8 to be described later.

The current sensor 450 may measure an internal current of the wireless power transmitter 400. More specifically, the current sensor 450 may measure an input current input to a driver 421. In this case, the measured input current may be the internal current. The current sensor 450 may provide a measured input current value to the controller 440. The present disclosure is not limited thereto, and the current sensor 450 may measure a coil current input to the transmission coil 423. In this case, the measured coil current may be the internal current. For example, the controller 440 may adaptively block power from being supplied from the power source 100 or block power from being supplied to the amplifier 412 based on the internal current value measured by the current sensor 450. As another example, the controller 440 may determine a state such as the presence or absence of a foreign substance in the charging region based on the internal current value measured by the current sensor 450. A detailed description thereof will be given with reference to FIGS. 6 to 8 to be described later.

The timer 490 may measure a time according to a predetermined event. For example, the controller 440 may adjust the strength of the driving voltage after a predetermined time has elapsed after determining that the foreign substance exists in the charging region or after determining that the foreign object is removed in the charging region. As another example, the controller 440 may exit the sleep mode after a certain time has elapsed after operating in the sleep mode.

The temperature sensor 460 may measure an internal temperature of the wireless power transmitter 400 and provide a result of the measurement to the controller 440. More specifically, temperature sensor 460 may include one or more temperature sensors. The one or more temperature sensors may be disposed corresponding to the transmission coil 423 of the power transmitting unit 420 to measure a temperature of the transmission coil 423. For example, the controller 440 may adaptively block power from being supplied from the power source 100 or block power from being supplied to the amplifier 412 based on a temperature value measured by the temperature sensor 460. To this end, one side of the power converter 410 may be further provided with a predetermined power cut-off circuit for cutting off the power supplied from the power source 100 or cutting off the power supplied to the amplifier 412. As another example, the controller 440 may adjust the strength of the power provided to the power transmitting unit 420 based on the temperature value measured by the temperature sensor 460. Accordingly, the wireless power transmitter according to the embodiment may prevent the internal circuit from being damaged due to overheating.

The power transmitting unit 420 may function to transmit a power signal output from the power converter 410 to the wireless power receiver. To this end, the power transmitting unit 420 may include a driver 421, a selector 422, and one or more transmission coils 423.

The driver 421 may generate an AC power signal in which an AC component having a specific frequency is inserted into a DC power signal output from the power converter 410 and transmit the generated AC power signal to the transmission coil 423. In this case, the frequencies of the AC power signals transferred to a plurality of transmission coils included in the transmission coil 423 may be the same as or different from each other.

The selector 422 may receive the AC power signal having the specific frequency from the driver 421 and transfer the AC power signal to a transmission coil selected among a plurality of transmission coils. Here, the coil selector 422 may perform control such that the AC power signal is transferred to the transmission coil selected by the controller 440 according to a predetermined control signal of the controller 440. More specifically, the selector 422 may include a switch (not shown) that connects an LC resonant circuit to the plurality of transmission coils 423. The present disclosure is not limited thereto, and the selector 422 may be excluded from the power transmitting unit 420 when the transmitter coil 423 is configured to include a single transmitter coil.

The transmission coil 423 may include at least one transmission coil, and may transmit the AC power signal received from the selector 422 to a receiver through the corresponding transmitting coil. When there are a plurality of transmission coils, the transmission coil 423 may be configured to include first to n-th transmission coils. The selector 422 may be implemented with a switch (not shown) or a multiplexer (not shown) to select a corresponding transmission coil from among the plurality of transmission coils. In addition, the transmission coil 423 may include one capacitor (not shown) connected in series with the plurality of transmission coils to implement an LC resonant circuit. One end of the capacitor (not shown) may be connected to the transmission coil 423 and the other end may be connected to the driver 421. Here, the 'corresponding transmission coil' may refer to a transmission coil having a state capable of being coupled with a reception coil of a wireless power receiver, which is qualified to receive power wirelessly, through an electromagnetic field. According to an embodiment, the controller 440 may dynamically select a transmission coil to be used for wireless power transfer among a plurality of transmission coils provided based on a signal strength indicator received in response to a first detection signal transmitted for each transmission coil. The first detection signal may be a digital ping signal. According to another embodiment, the controller 440 may dynamically select a transmission coil to be used for wireless power transfer among a plurality of transmission coils provided based on a signal strength indicator received in response to a second detection signal transmitted for each transmission coil. The second detection signal may have a smaller signal strength and a shorter transmission time than the first detection signal.

The modulator 431 may modulate the control signal generated by the controller 440 and transmit the modulated control signal to the driver 421. Here, a modulation scheme for modulating the control signal may include a frequency shift keying (FSK) modulation scheme, a Manchester coding modulation scheme, a Phase Shift Keying (PSK) modulation scheme, a pulse width modulation scheme, a differential bi-phase modulation scheme, and the like may be included, but is not limited thereto.

When a signal received through the transmission coil is detected, the demodulator 432 may demodulate and transmit the detected signal to the controller 440. Here, the demodulated signal may include a signal strength indicator, an error correction (EC) indicator for power control during wireless power transfer, an end of charge (EOC) indicator, an overvoltage/overcurrent/overheat indicator, and the like, but is not limited thereto, and may include various state information for identifying a state of the wireless power receiver.

In addition, the demodulator 432 may identify from which transmission coil the demodulated signal is received, and may provide the controller 440 with a predetermined transmission coil identifier corresponding to the identified transmission coil.

For example, the wireless power transmitter 400 may obtain the signal strength indicator through in-band communication to communicate with the wireless power receiver by using the same frequency used for wireless power transfer.

In addition, the wireless power transmitter 400 may not only transmit wireless power using the transmission coil 423 but also exchange various information with the wireless power receiver through the transmission coil 423. As another example, it should be noted that the wireless power transmitter 400 may further include a separate coil corresponding to each of the transmission coils 423 (that is, the first to n-th transmission coils), and may also perform in-band communication with the wireless power receiver.

The storage unit 470 may store an internal current value of the wireless power receiver or a wireless power transmitter for determining the presence or absence of a foreign substance, a reference time, a driving voltage strength according to the wireless power receiver or the presence of a foreign object, a type of a detection signal, whether a sleep mode is operated, whether a fan is operated, a fan RPM, or the like.

The fan 480 may be rotated by a motor to cool the wireless power transmitter 400 that is overheated. The fan 480 may be disposed to correspond to a configuration in which the degree of overheating is considerable. For example, the fan 480 may be disposed to correspond to the power transmitting unit 420. More specifically, the fan 480 may be disposed to correspond to the transmission coil 423 of the power transmitting unit 420. The controller 240 may operate the fan 480 according to the charging state of the wireless power receiver.

Figure 5:
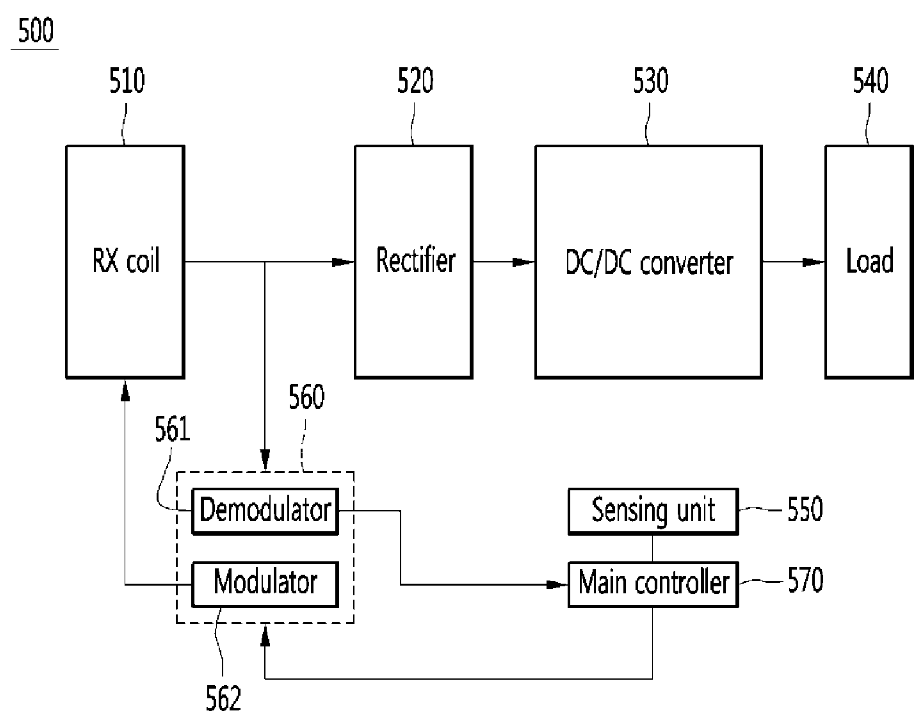
FIG. 5 is a block diagram for describing a structure of a wireless power receiver interworking with the wireless power transmitter according to FIG. 4.

FIG. 5 is a block diagram for describing a structure of a wireless power receiver interworking with the wireless power transmitter according to FIG. 4.

Referring to FIG. 5, a wireless power receiver 500 may include a wireless charging coil module 510, a rectifier 520, a DC/DC converter 530, a load 540, a sensing unit 550, a wireless charging communication unit 560 and a main controller 570. Here, the wireless charging communication unit 560 may be configured to include at least one of a demodulator 561 and a modulator 562.

AC power received through the wireless charging coil module 510 may be transferred to the rectifier 520. The rectifier 520 may convert AC power into DC power and transmit the DC power to the DC/DC converter 530. The DC/DC converter 530 may convert the strength of the DC power output from the rectifier into a specific strength required by the load 540 and then transfer the power to the load 540. In addition, the wireless charging coil module 510 may include a plurality of reception coils (not shown), that is, first to n-th reception coils. The frequencies of AC power respectively transferred to the reception coils (not shown) according to one embodiment may be different from each other, and in another embodiment, resonant frequencies for the reception coils may be set differently using a predetermined frequency controller with a function for adjusting LC resonance characteristics differently with respect to the reception coils.

The sensing unit 550 may measure the strength of DC power output from the rectifier 520 and provide the same to the main controller 570. In addition, the sensing unit 550 may measure a strength of the current applied to the receiving coil 510 according to the wireless power reception, and may transmit a measurement result to the main controller 570. As an example, the main controller 570 may determine whether an overvoltage occurs by comparing the measured strength of the DC power output from the rectifier with a predetermined reference value. As a result of the determination, when the overvoltage occurs, a predetermined packet indicating that the overvoltage has occurred may be generated and transmitted to the modulator 562. Here, a signal modulated by the modulator 562 may be transmitted to the wireless power transmitter through the reception coil 510 or a separate coil (not shown). In addition, the main controller 570 may determine that a detection signal is received when the strength of the DC power output from the rectifier is greater than or equal to a predetermined reference value and when the detection signal is received, perform control such that a signal strength indicator corresponding to the detection signal is transmitted to the wireless power transmitter through the modulator 562. As another example, the demodulator 561 may demodulate an AC power signal between the reception coil 510 and the rectifier 520 or the DC power signal output from the rectifier 520, identify whether the detection signal is received and then provide a result of the identification to the main controller 570. In this case, the main controller 570 may perform control such that the signal strength indicator corresponding to the detection signal is transmitted through the modulator 562. In addition, the sensing unit 550 may measure an internal temperature of the wireless power receiver 500 and provide a measured temperature value to the main controller 570. More specifically, the sensing unit 550 may include one or more temperature sensors. The one or more temperature sensors may measure a temperature of the reception coil of the charging coil module 510. For example, the main controller 570 may determine whether overheating occurs by comparing the measured internal temperature with a predetermined reference value. When overheating occurs as a result of the determination, a predetermined packet indicating that overheating has occurred may be generated and transmitted to the modulator 562. Here, a signal modulated by the modulator 562 may be transmitted to the wireless power transmitter through the reception coil 510 or a separate coil (not shown).

Figure 6:
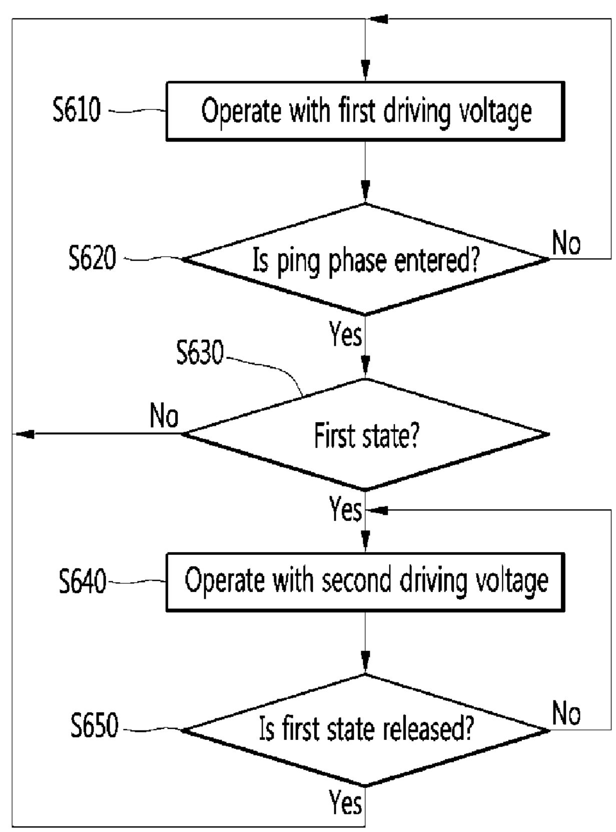
FIG. 6 is a flowchart for describing a wireless power transfer method in a wireless power transmitter according to an embodiment.

FIG. 6 is a flowchart for describing a wireless power transfer method in a wireless power transmitter according to an embodiment, and Table 1 is a table for showing an internal current value according to a charging region state of a wireless power transmitter and a driving voltage.

TABLE 1

| | Internal Current (A) in case of first driving voltage | Internal Current (B) in case of second driving voltage |
|---|---|---|
| First state | A ≥ 700 mA | B ≥ 700 mA |
| Second state | A ≤ 400 mA | B ≥ 700 mA |
| Third state | 600 mA ≤ A < 700 mA | 300 mA ≤ B < 400 mA |

Referring to Table 1, the charging region state of the wireless power transmitter indicates whether the wireless power transmitter or a foreign substance exists in the charging region. The charging region state may include first to third states. The first state is a state in which a foreign substance exists in the charging region of the wireless power transmitter. The foreign substance may include a metal material capable of absorbing electromagnetic fields. The second state may be a state in which a foreign substance or a wireless power receiver does not exist in the charging region of the wireless power transmitter. That is, the second state may be a state in which a material capable of absorbing wireless power does not exist in the charging region of the wireless power transmitter. The third state may be a state in which a wireless power receiver capable of receiving wireless power exists in a charging region of the wireless power transmitter. The first driving voltage may have a voltage magnitude required to output wireless power in accordance with a power transfer contract. In addition, in the wireless power transmitter, the power transmitting unit 420 may transmit a first detection signal when the power converter 410 provides the first driving voltage. For example, the first driving voltage may be in a range of 3 V to 4 V. More specifically, the first driving voltage may be 3.5 V. The second driving voltage may have a smaller strength than the first driving voltage. In the wireless power transmitter, the power transmitting unit 420 may transmit a second detection signal when the power converter 410 provides the second driving voltage. For example, the second driving voltage may be in a range of 0.5 V to 1.5 V. More specifically, the second driving voltage may be 1 V.

Referring to the case of operating with the first driving voltage, the internal current A of the wireless power transmitter may flow 700 mA or more in a first state. That is, when a foreign substance is present in the charging region, the internal current A of the wireless power transmitter may increase, so that the internal current A of the wireless power transmitter may be the largest among the first to third states. The internal current A of the wireless power transmitter may flow 400 mA or less in the second state. That is, since there is no material absorbing the wireless power when a foreign substance and a wireless power receiver do not exist in the charging region, the internal current A of the wireless power transmitter may be the smallest among the first to third states. The internal current A of the wireless power transmitter may flow from 600 mA to less than 700 mA in the third state. That is, when the wireless power receiver exists in the charging region of the wireless power transmitter, the internal current A of the wireless power transmitter may flow smaller than that when the foreign substance exists in the charging region of the wireless power transmitter.

Referring to the case of operating with the second driving voltage, the internal current B of the wireless power transmitter may flow 400 mA or more in the first state. That is, when a foreign substance is present in the charging region of the wireless power transmitter, the internal current B of the wireless power transmitter may increase, so that the internal current B of the wireless power transmitter may be the largest among the first to third states. The internal current B of the wireless power transmitter may flow 200 mA or less in the second state. That is, since there is no material absorbing the wireless power when a foreign substance and a wireless power receiver do not exist in the charging region of the wireless power transmitter, the internal current B of the wireless power transmitter may be the smallest among the first to third states. The internal current B of the wireless power transmitter may flow from 300 mA to less than 400 mA in the third state. That is, when the wireless power receiver exists in the charging region of the wireless power transmitter, the internal current B of the wireless power transmitter may flow smaller than that when the foreign substance exists in the charging region of the wireless power transmitter. Accordingly, the wireless power transmitter may decrease the internal current B of the wireless power transmitter when the wireless power transmitter operates with the second driving voltage rather than the first driving voltage.

Referring to FIG. 6, a wireless power transfer method in the wireless power transmitter may include operating, by the wireless power transmitter, with the first driving voltage (S610). In this case, the wireless power transmitter may generate an analog ping signal, a first detection signal, or the like based on the first driving voltage.

The wireless power transfer method in the wireless power transmitter may include determining whether a ping phase is entered (S620). More specifically, the wireless power transmitter may transmit the analog ping signal generated based on the first driving voltage, and detect whether an object exists in the charging region of the wireless power transmitter based on a change in the internal current. The wireless power transmitter may transition to the ping phase when an object is detected, and operate with the first driving voltage in the selection phase when the object is not detected.

The wireless power transfer method in the wireless power transmitter may include determining whether the wireless power transmitter is in the first state (S630). The determining whether the wireless power transmitter is in the first state is to determine whether a foreign substance exists in the charging region of the wireless power transmitter. A specific method of determining whether the wireless power transmitter is in the first state may follow the wireless power transfer method of FIGS. 7 and 8.

The wireless power transfer method in the wireless power transmitter may include operating by the wireless power transmitter, with a second driving voltage when it is determined that the wireless power transmitter is in the first state (S640). In this case, the wireless power transmitter may generate a second detection signal or the like based on the second driving voltage.

The wireless power transfer method in the wireless power transmitter may include determining, by the wireless power transmitter, whether the first state is released (S660). The determining whether the first state is released is to determine whether the foreign substance is removed from or the wireless power receiver exists in the charging region of the wireless power transmitter. The determining whether the first state is released may include a method of determining whether the wireless power transmitter is in the second state of FIG. 7 or a method of determining whether the wireless power transmitter is in the third state of FIG. 8. A detailed description thereof will be described with reference to FIGS. 7 to 8. When the wireless power transmitter determines that the first state is released, the wireless power transmitter may transition to the step of operating with the first driving voltage in S610.

Therefore, according to the embodiment, the driving voltage is lowered according to the presence of the foreign substance, thereby causing a decrease in the strength of the electromagnetic field. In addition, according to the embodiment, since the strength of the electromagnetic field decreases, the heating phenomenon generated in the foreign substance may be removed. In addition, according to the embodiment, since the strength of the electromagnetic field decreases, FM radio frequency interference may be eliminated. In addition, according to the embodiment, since the driving voltage is lowered, standby power may be reduced. In addition, according to the embodiment, since the strength of the driving voltage is lowered, heating phenomenon of the coil may be eliminated. In addition, according to the embodiment, the detection signal may be controlled.

Figure 7A:
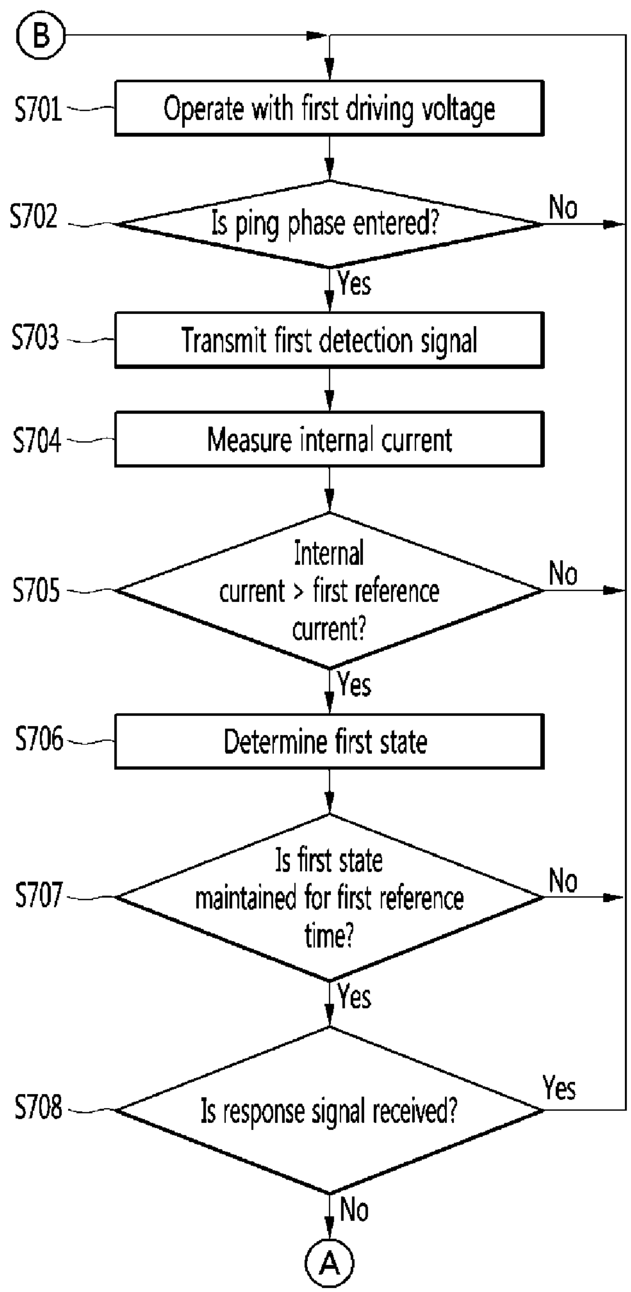
FIG. 7 is a flowchart for describing a wireless power transfer method in a wireless power transmitter according to an embodiment.
Figure 7B:
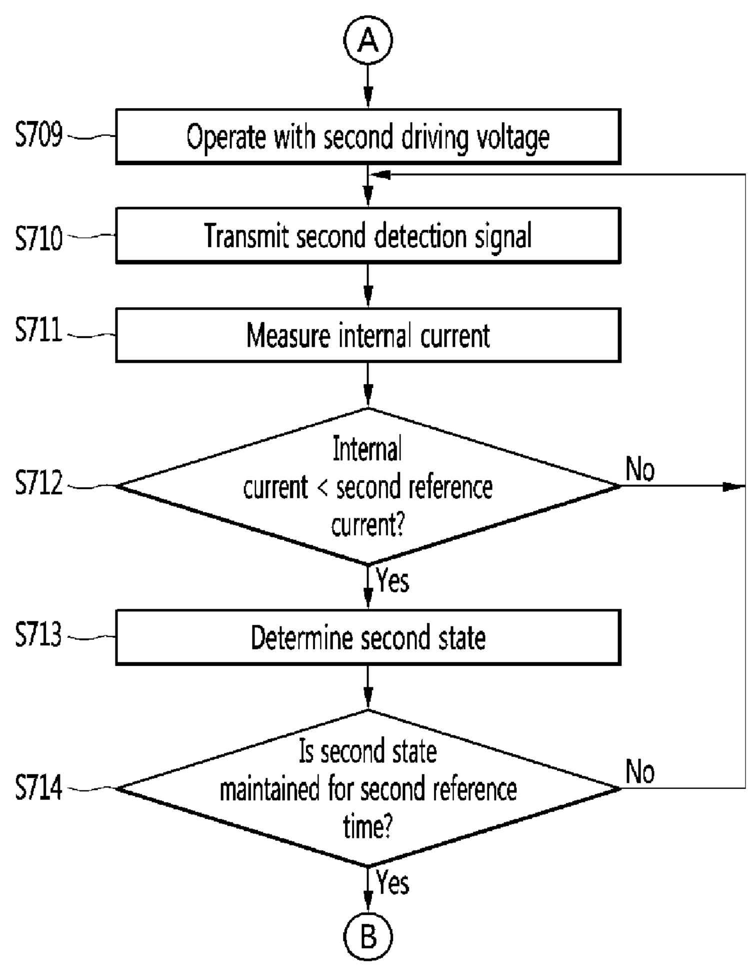

FIG. 7 is a flowchart for describing a wireless power transfer method in a wireless power transmitter according to an embodiment.

Referring to FIG. 7, the wireless power transfer method in the wireless power transmitter may include operating, by the wireless power transmitter, with a first driving voltage (S701). In this case, the wireless power transmitter may generate an analog ping signal, a first detection signal, or the like based on the first driving voltage. For example, the first driving voltage may be in a range of 3 V to 4 V. More specifically, the first driving voltage may be 3.5 V.

The wireless power transfer method in the wireless power transmitter may include determining whether a ping phase is entered (S702). More specifically, the wireless power transmitter may transmit an analog ping signal generated based on the first driving voltage, and detect whether an object exists in the charging region of the wireless power transmitter based on a change in the internal current of the wireless power transmitter. The wireless power transmitter may transition to the ping phase when the object is detected, and repeatedly perform the step S701 to operate with the first driving voltage in the selection phase.

The wireless power transfer method in the wireless power transmitter may include transmitting a first detection signal (S703). The first detection signal may be a digital ping signal. More specifically, the analog ping signal may have a transmission time of about 5 ms or less. The transmission time of the digital ping signal may be about 65 ms. That is, there is a significant difference in the transmission time between the analog ping signal and the digital ping signal. In addition, since the first detection signal is generated based on the first driving voltage having a higher level than the second driving voltage, the first detection signal may have a level higher than that of the second detection signal generated based on the second driving voltage. Therefore, when the first detection signal is continuously transmitted after the detection of the object, standby power consumption is increased, and serious heating phenomenon and noise generation may occur due to the electromagnetic field absorbed by the foreign substance.

The wireless power transfer method in the wireless power transmitter may include a step of measuring an internal current of the wireless power transmitter (S704). A current sensor of the wireless power transmitter may measure the internal current of the wireless power transmitter.

The wireless power transfer method in the wireless power transmitter may include a step of determining whether the measured internal current value is greater than or equal to a first reference current value (S705). The first reference current may be a reference current flowing therethrough when the first detection signal is transmitted when the wireless power transmitter is in the first state in which the foreign substance exists in the charging region of the wireless power transmitter. For example, the first reference current may be 700 mA. That is, the first reference current may be an internal current value of the wireless power transmitter when operating with the first driving voltage in the first state in Table 1. When the measured internal current value is less than the first reference current value, step S701 may be repeatedly performed.

The wireless power transfer method in the wireless power transmitter may include a step of determining that the wireless power transmitter is in the first state when the measured internal current value is greater than or equal to a first reference current value (S706). That is, the wireless power transmitter may determine whether a foreign substance exists in the charging region of the wireless power transmitter based on the internal current value.

The wireless power transfer method in the wireless power transmitter may include a step of determining whether the first state is maintained for a first reference time (S707). A timer of the wireless power transmitter may operate when the first state is determined. The controller of the wireless power transmitter may compare a time for which the first state is maintained with the first reference time. Accordingly, the wireless power transfer method may accurately determine whether a foreign substance exists in the charging region of the wireless power transmitter. In addition, the wireless power transfer method may determine whether the foreign substance has been removed by performing comparison in real time as to whether the internal current of the wireless power transmitter is lower than the first reference current during the time for which the first state is maintained. The wireless power transmitter may repeatedly perform step s701 when the first state is not maintained for the first reference time.

The wireless power transfer method in the wireless power transmitter may include a step of determining whether the wireless power transmitter receives a response signal (S708). The wireless power transmitter may determine whether the response signal is received from a wireless power receiver in response to the first detection signal. The response signal may be a signal strength packet including a signal strength value indicating a coupling state of the wireless power receiver. There may be a case where the wireless power transmitter receives the signal strength packet due to the existence of the wireless power receiver even when it is determined that the wireless power transmitter is in the first state. When the wireless power transmitter receives the response signal in the first state, the wireless power transmitter may repeatedly perform step S701 to continue to operate with the first driving voltage.

The wireless power transfer method in the wireless power transmitter may include a step of operating with second driving voltage when the response signal is not received in the first state (S709). In this case, the wireless power transmitter may generate the second detection signal or the like based on the second driving voltage. The wireless power transmitter may generate the second detection signal in the ping phase. The second driving voltage may have a smaller strength than the first driving voltage. For example, the second driving voltage may be in a range of 0.5 V to 1.5 V. More specifically, the second driving voltage may be 1 V.

The wireless power transfer method in the wireless power transmitter may include transmitting a second detection signal (S710). The transmission time of the second detection signal may be smaller than the transmission time of the first detection signal. For example, the transmission time of the second detection signal may be about 30 ms. In addition, the second detection signal may have a level smaller than the level of the first detection signal. That is, since the second detection signal is generated based on the first driving voltage having a lower level than the first driving voltage, the second detection signal may have a level lower than that of the first detection signal generated based on the first driving voltage. Therefore, when the first state is determined after the detection of the object, it is possible to reduce standby power consumption by transmitting the second detection signal, thereby reducing the electromagnetic field absorbed by the foreign substance, and eliminating heating phenomenon and noise generation.

The wireless power transfer method in the wireless power transmitter may include a step of measuring an internal current of the wireless power transmitter after transmitting the second detection signal (S711). A current sensor of the wireless power transmitter may measure the internal current of the wireless power transmitter.

The wireless power transfer method in the wireless power transmitter may include a step of determining whether the measured internal current value is less than a second reference current value (S712). The second reference current may be a reference current flowing therethrough when the second detection signal is transmitted when the wireless power transmitter is in the second state in which the foreign substance does not exist. For example, the first reference current may be 400 mA. When the measured internal current value is greater than or equal to the second reference current value, the first state in which a foreign substance still exists is determined and step S710 may be repeatedly performed.

The wireless power transfer method in the wireless power transmitter may include a step of determining the second state when the measured internal current value is less than a second reference current value (S713). That is, the wireless power transmitter may determine whether a foreign substance does not exist in the charging region of the wireless power transmitter based on the internal current value.

The wireless power transfer method in the wireless power transmitter may include a step of determining whether the second state is maintained for a second reference time (S714). A timer of the wireless power transmitter may operate when the second state is determined. The controller of the wireless power transmitter may compare a time for which the second state is maintained with the second reference time. Accordingly, the wireless power transfer method may accurately determine a state in which a foreign substance does not exist in the charging region of the wireless power transmitter. In addition, the second reference time may be shorter than the first reference time. This is because there is a possibility that a response of the wireless power receiver according to the initial transmission of a detection signal of the wireless power transmitter is late, and wireless charging may not operate normally in the case of operating with the second driving voltage which is a low voltage. In addition, since there may be a case where the user wants to quickly charge the wireless power transmitter by removing a foreign substance, the second reference time may be shorter than the first reference time, thereby rapidly returning to operating with the first driving voltage. The wireless power transmitter may repeatedly perform step S701 when the second state is maintained for the second reference time. The wireless power transmitter may repeatedly perform step S701 of transmitting a second detection signal when the second state is not maintained for the second reference time. In addition, the wireless power transfer method may determine whether the foreign substance exists again by performing comparison in real time as to whether the internal current is greater than or equal to a second reference current during a time for which the second state is maintained.

Therefore, according to an embodiment, the driving voltage may be lowered according to the presence of the foreign substance, thereby lowering the strength of the detection signal. In addition, according to an embodiment, the strength of the detection signal may be lowered to remove heating phenomenon generated in the foreign substance. In addition, according to an embodiment, since the driving voltage is lowered, thereby reducing standby power. In addition, according to an embodiment, since the strength of the detection signal is lowered, the FM radio frequency interference may be eliminated. In addition, according to an embodiment, since the strength of the driving voltage is lowered, heating phenomenon of a coil may be eliminated.

Figure 8:
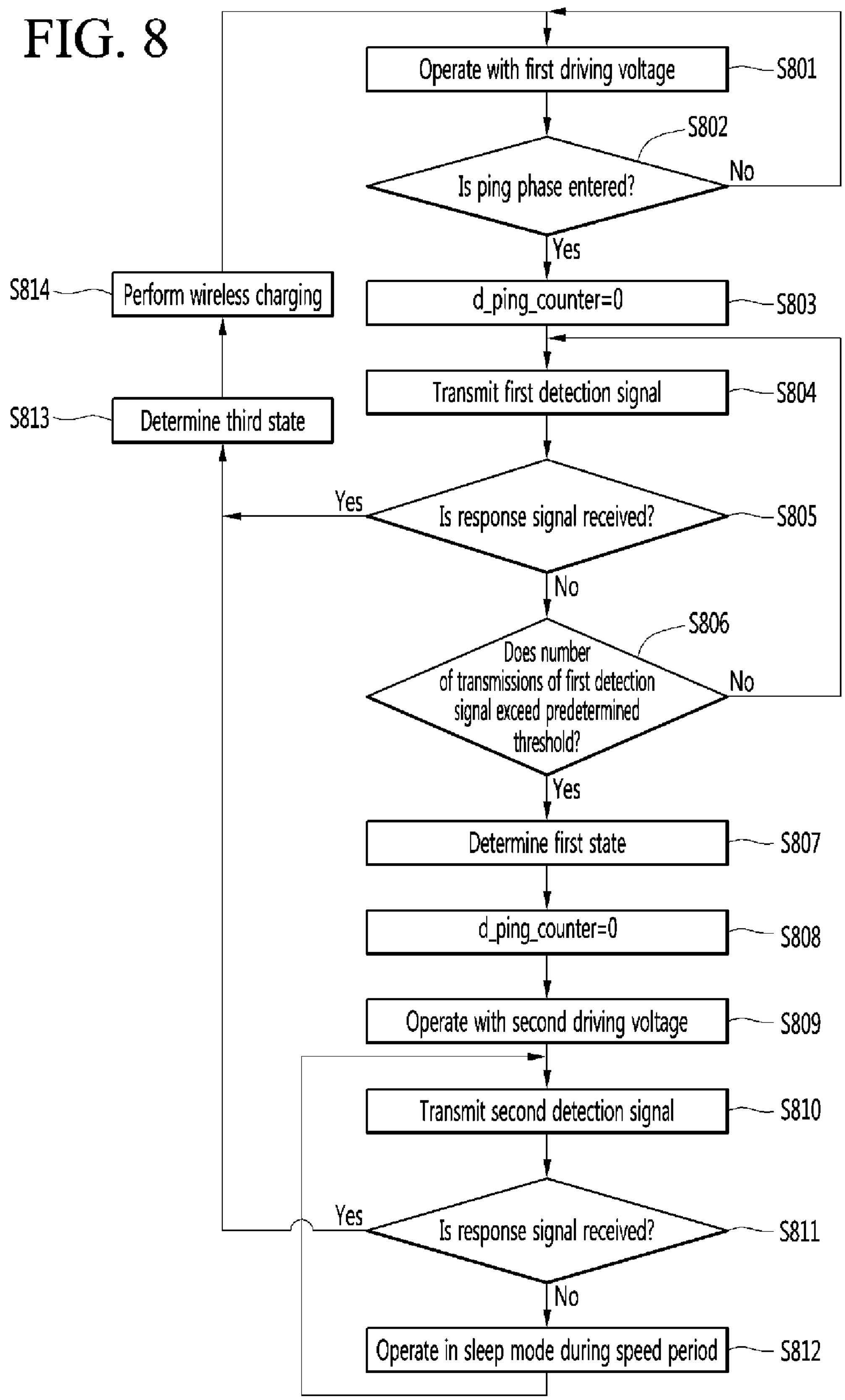
FIG. 8 is a flowchart for describing a wireless power transfer method in a wireless power transmitter according to another embodiment.

FIG. 8 is a flowchart for describing a wireless power transfer method in a wireless power transmitter according to another embodiment.

Referring to FIG. 8, a wireless power transfer method in a wireless power transmitter may include a step of operating, by the wireless power transmitter, with a first driving voltage (S801). In this case, the wireless power transmitter may generate an analog ping signal, a first detection signal, or the like based on the first driving voltage. For example, the first driving voltage may be in a range of 3 V to 4 V. More specifically, the first driving voltage may be 3.5 V.

The wireless power transfer method in the wireless power transmitter may include determining whether a ping phase is entered (S802). More specifically, the wireless power transmitter may transmit an analog ping signal generated based on the first driving voltage, and detect whether an object exists in a charging region based on a change in the internal current of the wireless power transmitter. The wireless power transmitter may transition to the ping phase when the object is detected, and repeatedly perform the step S801 to operate with the first driving voltage in the selection phase when the object is not detected.

The wireless power transfer method in the wireless power transmitter may include a step of initializing a first detection signal counter (d_ping_counter) to 0 when the ping phase is entered (S803).

The wireless power transfer method in the wireless power transmitter may include transmitting a first detection signal (S803). The first detection signal may be a digital ping signal. More specifically, the analog ping signal may have a transmission time of about 5 ms or less. The transmission time of the digital ping signal may be about 65 ms. That is, there is a significant difference in the transmission time between the analog ping signal and the digital ping signal. In addition, since the first detection signal is generated based on the first driving voltage having a higher level than the second driving voltage, the first detection signal may have a level higher than that of the second detection signal generated based on the second driving voltage. Therefore, when the first detection signal is continuously transmitted after the detection of the object, standby power consumption is increased, and serious heating phenomenon and noise generation may occur due to the electromagnetic field absorbed by the foreign substance.

The wireless power transfer method in the wireless power transmitter may include a step of determining whether the wireless power transmitter receives a response signal (S805). The wireless power transmitter may determine whether the response signal is received from a wireless power receiver in response to the first detection signal. The response signal may be a signal strength packet including a signal strength value indicating a coupling state of the wireless power receiver. When the wireless power transmitter receives a response signal after entering the ping phase, the wireless power transmitter may determine a third state in which the wireless power receiver exists (S813). When determining the third state, the wireless power transmitter may perform wireless charging (S814). In addition, when the wireless charging is performed, the wireless power transmitter may continue to operate with the first driving voltage (S801).

In the wireless power transmitter, with the wireless power transmitter does not receive a response signal, the wireless power transfer method may include a step of determining whether the first detection signal counter (d_ping_counter) exceeds a predetermined threshold after the wireless power transmitter increases the first detection signal counter (d_ping_counter) by one when the wireless power transmitter does not receive a response signal (S806). The predetermined threshold may be the number of transmissions of the first detection signal sufficient to determine whether a wireless power receiver exits. For example, the predetermined threshold may be five. As a result of the determination in step S806, when the first detection signal counter does not exceed the predetermined threshold, a return to step S804 may be made. Accordingly, the wireless power transmitter may prevent the foreign substance from being mistaken as existing even though the wireless power receiver exists.

The wireless power transfer method in the wireless power transmitter may include a step of determining a first state when a first detection signal counter exceeds a predetermined threshold (S807). That is, the wireless power transmitter may determine whether a foreign substance exists in the charging region of the wireless power transmitter based on the internal current value.

The wireless power transfer method in the wireless power transmitter may include a step of initializing a first detection signal counter to zero when the first state is determined (S808).

The wireless power transfer method in the wireless power transmitter may include a step of operating with a second driving voltage when the first state is determined (S809). In this case, the wireless power transmitter may generate the second detection signal or the like based on the second driving voltage. The wireless power transmitter may generate the second detection signal in the ping phase. The second driving voltage may have a smaller strength than the first driving voltage. For example, the second driving voltage may be in a range of 0.5 V to 1.5 V. More specifically, the second driving voltage may be 1 V.

The wireless power transfer method in the wireless power transmitter may include transmitting a second detection signal (S810) The transmission time of the second detection signal may be smaller than the transmission time of the first detection signal. For example, the transmission time of the second detection signal may be about 30 ms. In addition, the second detection signal may have a level smaller than the level of the first detection signal. That is, since the second detection signal is generated based on the second driving voltage having a lower level than the first driving voltage, the second detection signal may have a level lower than that of the first detection signal generated based on the first driving voltage. Therefore, when the first state is determined after the detection of an object, the standby power consumption may be reduced by transmitting the second detection signal and the electromagnetic field absorbed by the foreign substance is reduced to eliminate the heating phenomenon and noise generation.

The wireless power transfer method in the wireless power transmitter may include a step of determining whether the wireless power transmitter receives a response signal (S811). The wireless power transmitter may determine whether the response signal is received from a wireless power receiver in response to the second detection signal. The response signal may be a signal strength packet including a signal strength value indicating a coupling state of the wireless power receiver. That is, the wireless power receiver may transmit a response signal to the wireless power transmitter in response to the first detection signal or the second detection signal. There may be a case where the wireless power transmitter receives the signal strength packet due to the presence of the wireless power receiver even when it is determined that the wireless power transmitter is in the first state. When the wireless power transmitter receives a response signal in the first state, the wireless power transmitter may determine a third state in which the wireless power receiver exists (S813). When determining that the wireless power transmitter is in the third state, the wireless power transmitter may perform wireless charging (S814). In addition, when the wireless charging is performed, the wireless power transmitter may continue to operate with the first driving voltage (S801).

The wireless power transfer method in the wireless power transmitter may include a step of operating in a sleep mode during a sleep period when the wireless power transmitter does not receive a response signal in the first state (S812). In the sleep mode, the wireless power transmitter may wait without transmitting the first detection signal or the second detection signal. Accordingly, the wireless power transmitter may prevent power consumption due to transmission of the detection signal during the sleep mode. The sleep period may be a time sufficient for a foreign substance to be removed in the charging region of the wireless power transmitter and for the wireless power receiver to exist. For example, the sleep period may be 5 to 10 minutes. The wireless power transmitter may transmit the second detection signal of S810 again when the sleep period has elapsed.

Therefore, according to another embodiment, the driving voltage may be lowered according to the presence of the foreign substance, thereby lowering the strength of the detection signal. In addition, according to another embodiment, the strength of the detection signal may be lowered to remove heating phenomenon generated in the foreign substance. In addition, according to another embodiment, since the driving voltage is lowered, thereby reducing standby power. In addition, according to another embodiment, since the strength of the detection signal is lowered, the FM radio frequency interference may be eliminated. In addition, according to another embodiment, since the strength of the driving voltage is lowered, heating phenomenon of a coil may be eliminated.

The method according to the embodiment described above may be produced as a program for execution on a computer and stored in a computer-readable recording medium and examples of the computer-readable recording medium may include ROM, RAM, CD-ROM, magnetic tape, Floppy disks, optical data storage, and the like, and also include those implemented in the form of carrier waves (e.g., transmission over the Internet).

The computer-readable recording medium may be distributed over computer systems connected through networks so that the computer readable codes are stored and executed in a distributed fashion. In addition, functional programs, codes, and code segments for implementing the above-described method may be easily inferred by programmers in the art to which the embodiments belong.

It will be apparent to those skilled in the art that the present invention can be embodied in other specific forms without departing from the spirit and essential features of the invention.

Accordingly, the above detailed description should not be construed as limiting in all aspects and should be considered as illustrative. The scope of the present invention should be determined by reasonable interpretation of the appended claims, and all changes within the equivalent scope of the present invention are included in the scope of the present invention.

The present disclosure can be used in the field of wireless power transmission and reception.

The invention claimed is:

1. A wireless power transfer method for a wireless power transmitter which wirelessly transmits power to a wireless power receiver, the method comprising:
- operating with a first driving voltage;
- determining whether the wireless power transmitter has entered a ping phase;
- when the ping phase is determined to be entered, determining whether the wireless power transmitter is in a first state; and
- when the wireless power transmitter is determined to be in the first state, operating with a second driving voltage,
- wherein the determining of whether the wireless power transmitter is in the first state includes:
  - transmitting a first detection signal to the wireless power receiver;
  - measuring an internal current of the wireless power transmitter;
  - determining whether the measured internal current is greater than or equal to a first reference current; and
  - determining that the wireless power transmitter is in the first state when the measured internal current is determined to be greater than or equal to the first reference current, wherein the determining of whether the wireless power transmitter is in the first state includes determining whether the first state is maintained at the wireless power transmitter for a first reference time, further comprising:

when operating with the second driving voltage, transmitting a second detection signal to the wireless power receiver;

after transmitting the second detection signal, measuring an internal current of the wireless power transmitter;

determining whether the measured internal current is less than a second reference current after the second detection signal is transmitted;

determining that the wireless power transmitter is in a second state when the measured internal current is determined to be less than a second reference current after the second detection signal is transmitted;

determining whether the second state is maintained at the wireless power transmitter for a second reference time; and operating with the first driving voltage when the second state is determined to be maintained at the wireless power transmitter for the second reference time.

2. The wireless power transfer method of claim 1, wherein the determining of whether the wireless power transmitter is in the first state includes determining whether the wireless power transmitter receives, from the wireless power receiver, a response signal to the first detection signal.

3. The wireless power transfer method of claim 1, wherein the first reference current is larger than the second reference current.

4. The wireless power transfer method of claim 1, wherein the first reference time is longer than the second reference time.

5. The wireless power transfer method of claim 1, wherein the first state is a state in which a foreign substance is believed to exist at a charging region of the wireless power transmitter, and wherein the second state is a state in which a foreign substance is believed to not exist at the charging region of the wireless power transmitter.

6. The wireless power transfer method of claim 1, wherein a third state is a state in which the wireless power receiver is believed to exist at a charging region of the wireless power transmitter, and wherein the first reference current is a maximum internal current value when the wireless power transmitter operates with the first driving voltage.

7. The wireless power transfer method of claim 1, wherein the first driving voltage is greater than the second driving voltage.

8. A wireless power transfer method for a wireless power transmitter which wirelessly transmits power to a wireless power receiver, the method comprising:

operating with a first driving voltage;

determining whether the wireless power transmitter has entered a ping phase;

when the ping phase is determined to be entered, determining whether the wireless power transmitter is in a first state; and when the wireless power transmitter is determined to be in the first state, operating with a second driving voltage, wherein the determining of whether the wireless power transmitter is in the first state includes:

initializing a first detection signal counter to have a total count at zero;

transmitting a first detection signal to the wireless power receiver;

determining whether the wireless power transmitter receives, from the wireless power receiver, a response signal to the first detection signal;

when the response signal is determined to not be received at the wireless power transmitter, increasing the total count of the first detection signal counter by one and determining whether the total count of the first detection signal counter exceeds a predetermined threshold;

determining that the wireless power transmitter is in the first state when the total count of the first detection signal counter is determined to exceed the predetermined threshold; and operating with the second driving voltage when the wireless power transmitter is determined to be in the first state.

9. The wireless power transfer method of claim 8, wherein the operating with the second driving voltage in the first state includes initializing the first detection signal counter to have a total count of one.

10. The wireless power transfer method of claim 8, further comprising:

when operating with the second driving voltage, transmitting a second detection signal to the wireless power receiver; and determining whether the wireless power transmitter receives, from the wireless power receiver, a response signal to the second detection signal.

11. The wireless power transfer method of claim 10, further comprising:

when the response signal is determined to not be received at the wireless power transmitter, operating the wireless power transmitter in a sleep mode during a sleep period.

12. The wireless power transfer method of claim 11, further comprising:

when the sleep period elapses, transmitting the second detection signal to the wireless power receiver.

13. The wireless power transfer method of claim 9, wherein the first driving voltage is greater than the second driving voltage.

14. A wireless power transmitter for wirelessly transmitting power to a wireless power receiver, the wireless power transmitter comprising:

a power converter configured to provide a first driving voltage and to provide a second driving voltage;

a power transmitter configured to transmit a first detection signal based on the first driving voltage and to transmit a second detection signal based on the second driving voltage; and a controller configured to control the power converter to provide the second driving voltage when the wireless power transmitter is in a first state, wherein the controller is configured to:

initialize a first detection signal counter to have a total count of zero when the wireless power transmitter has entered a ping phase, increase the total count of the first detection signal counter by one when the wireless power transmitter has not received a response signal to the first detection signal, and determine that the wireless power transmitter is in the first state when the total value of the first detection signal counter exceeds a predetermined threshold.

15. The wireless power transmitter of claim 14, further comprising:

a current sensor configured to measure an internal current of the wireless power transmitter, wherein the controller is configured to:

determine that the wireless power transmitter is in the first state when the measured internal current is greater than or equal to a first reference current, and control the power transmitter to transmit a second detection signal based on the second detection voltage.

16. The wireless power transmitter of claim 14, wherein the controller is configured to control the power transmitter to transmit the second detection signal based on the second driving voltage when the wireless power transmitter is determined to be in the first state.

17. A method to control wireless power at a wireless power transmitter, comprising:

generating, at the wireless power transmitter, a plurality of ping signals;

separately sensing a current corresponding to each of the ping signals; and adjusting a driving voltage of at least one of the ping signals based on the sensed current, wherein a first one of the plurality of ping signals is provided based on a first driving voltage, wherein adjusting the voltage of at least one of the ping signals includes determining a number of times that the sensed current is greater than a first reference current, and adjusting the voltage of the ping signals based on the first driving voltage to a second driving voltage when the determined number of times the sensed current is greater than the reference current exceeds a predetermined first value without response from a wireless power receiver.

18. The wireless power transfer method of claim 17, wherein the second voltage is less than the first voltage.

19. The wireless power transfer method of claim 18, wherein adjusting the voltage of at least one of the ping signals includes adjusting the driving voltage from the second driving voltage to the first driving voltage when the number of times the sensed current is less than a second reference current exceeds a predetermined second value.

* * * * *